United States Patent [19]

Samuelsson

[11] Patent Number: 4,486,976
[45] Date of Patent: Dec. 11, 1984

[54] WEED-KILLING ASSEMBLY

[76] Inventor: Bengt Å. Samuelsson, Torpa, 590 30 Borensberg, Sweden

[21] Appl. No.: 406,221

[22] PCT Filed: Nov. 20, 1981

[86] PCT No.: PCT/SE81/00339
§ 371 Date: Aug. 4, 1982
§ 102(e) Date: Aug. 4, 1982

[87] PCT Pub. No.: WO82/01978
PCT Pub. Date: Jun. 24, 1982

[30] Foreign Application Priority Data

Dec. 8, 1980 [SE] Sweden .................. 8008602
Oct. 13, 1981 [SE] Sweden .................. 8106065

[51] Int. Cl.³ .............................................. A01M 21/00
[52] U.S. Cl. .............................................. 47/1.5
[58] Field of Search ............... 47/1.5; 401/196–204; 251/205, 341, 342; 137/848; 138/28, 37, 111, 113, 114; 222/187, 478; 239/51.5, 58

[56] References Cited

U.S. PATENT DOCUMENTS

| | | | |
|---|---|---|---|
| 425,530 | 4/1890 | Wayte | 137/848 |
| 872,904 | 12/1907 | Connolly | 251/205 |
| 1,003,008 | 9/1911 | Pugh | 401/204 |
| 1,523,590 | 1/1925 | Hartshorn | 47/1.5 |
| 1,683,792 | 9/1928 | Naumburg | 239/57 |
| 1,930,040 | 10/1933 | Crowley | 137/848 X |
| 2,363,279 | 11/1944 | Anschicks | 251/205 X |
| 3,077,701 | 2/1963 | Osmun | 47/1.5 |
| 3,332,103 | 7/1967 | Case | 15/511 |
| 3,392,884 | 7/1968 | Waldrum | 222/187 X |
| 4,019,278 | 4/1977 | McKirdy | 47/1.5 |
| 4,187,638 | 2/1980 | Hardy et al. | 47/1.5 |
| 4,219,964 | 9/1980 | Dale | 47/1.5 |
| 4,302,904 | 12/1981 | Mead | 47/1.5 |
| 4,305,224 | 12/1981 | Maddock | 47/1.5 |
| 4,309,842 | 1/1982 | Jones | 47/1.5 |
| 4,426,807 | 1/1984 | Maddock | 47/1.5 |

FOREIGN PATENT DOCUMENTS

| | | | |
|---|---|---|---|
| 1030096 | 2/1957 | Fed. Rep. of Germany | 47/81 |
| 2423982 | 12/1979 | France | 47/1.5 |

*Primary Examiner*—James R. Feyrer
*Attorney, Agent, or Firm*—Fleit, Jacobson, Cohn & Price

[57] ABSTRACT

An assembly for contact killing of weeds by coating the weeds with liquid killer comprises: an elongated, finger or band-shaped, resiliently yielding supporting body, for instance in the form of a spring wire (14,44), a prestressed, closely wound helical spring (34) or a resilient tube (54); a capillary carrier for the killer, for instance in the form of a porous socket (15,25,35) or a wick (45, 55) disposed along the body and joined with it; a supply means (32–34,36,37) for killer (38); and a fastening means (13,23) supporting the assembly and positioned at least at one end of the assembly (10,20). The assembly can be supported in a direction deviating from the vertical direction (FIGS. 11–13).

8 Claims, 14 Drawing Figures

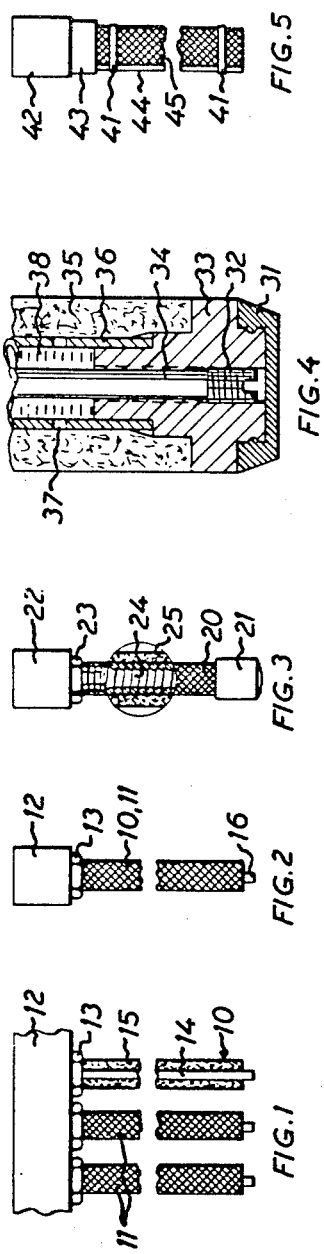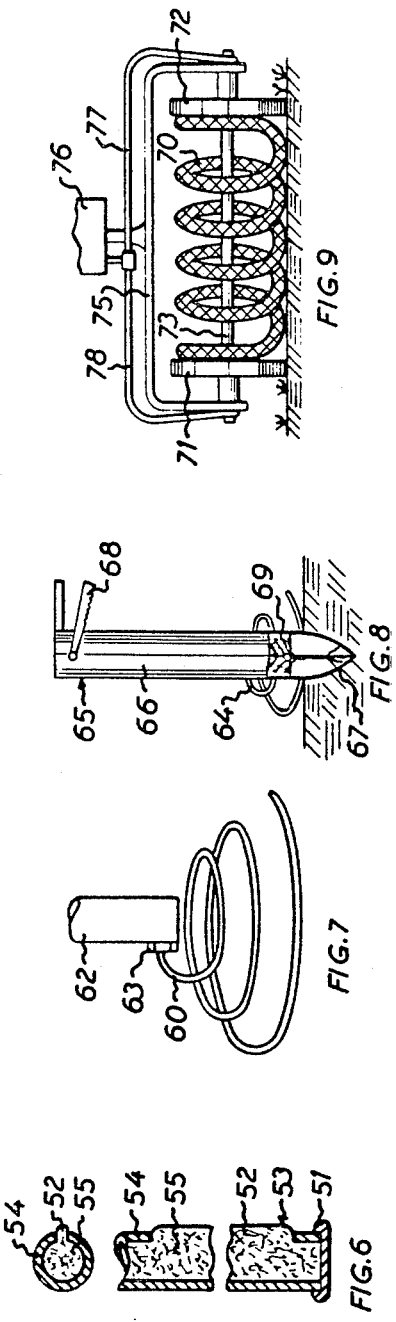

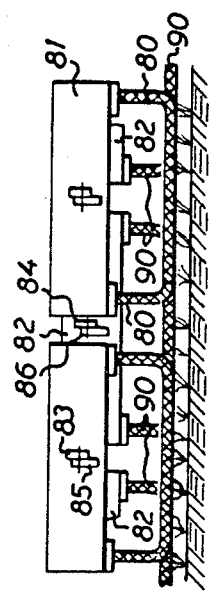
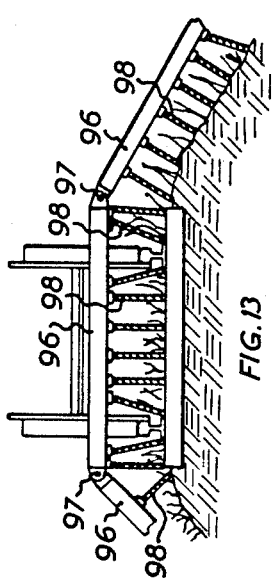
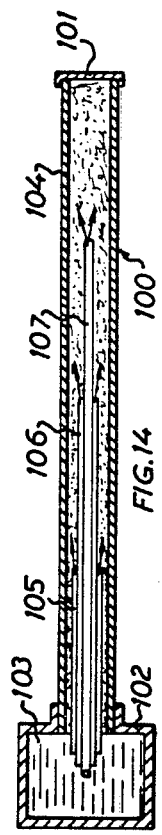
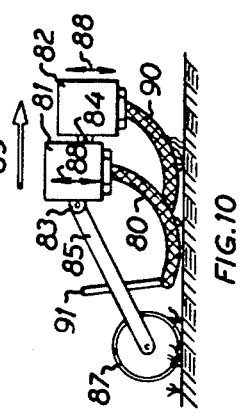
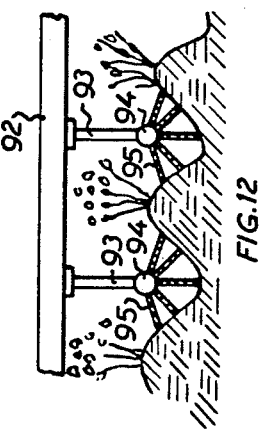

WEED-KILLING ASSEMBLY

In prior-art coating assemblies for killing of weeds by means of liquid killer the application of the killer is effected by means of freely depending capillary means in the form of a cloth, which may be slit into tongues, finger-like long members in the form of ropes or stockings of porous material, e.g. textile material or porous plastics material. Coating assemblies of such design have the disadvantage that, when certain types of vegetation and weeds are concerned, e.g. low-growth or creeping weeds, such assemblies are not capable of penetrating down to the weeds and of coating them efficiently. Nor can they act but in vertical direction, which in certain cases reduces their capability of attacking weeds. With the present invention the disadvantages mentioned are overcome and a coating assembly is provided, which can be given the desired form adapted to various purposes while being disposed at the same time to exert a desired force towards the surface or area to be coated.

This is realized in that the assembly comprises: a finger or band-shaped, elongated, resiliently yielding supporting body, for instance in the form of a spring wire, a prestressed, closely wound, helical spring or a resilient tube; a capillary carrier for the killer, for instance in the form of a porous stocking, a rope or a band of textile material, disposed along the resilient body and joined with it; a supply means for killer; and fastening means positioned at least at one end of the assembly for supporting the assembly.

In a second embodiment of the invention the body is a resilient tube enclosing the capillary carrier and having, at least along part of its length, at least one series of openings at which the capillary carrier disposes within the tube exhibit coating surfaces.

In a third embodiment the assembly has a body in the form of a straight finger or stick and is surrounded by the capillary carrier, while the assembly in a fourth embodiment may take the form of a conical helical line and be adapted, if desired, to be fitted on a planting stick or planting tube, primarily intended for forest plants, in order to coat the area around the plant to keep this free from weeds.

In a sixth embodiment the assembly has been carried out in the form of a cylindrical helical line and according to a specific design it may be placed between two round, diskshaped end walls or side wheels adjustable to provide various intermediate distances between them to coat an area of varying width by rolling on the ground.

In a seventh embodiment the assembly may have a weight, for instance in the form of a metal lining, at the free end of a finger-like assembly.

In an eighth embodiment the assembly is U-shaped and is adapted to be fastened at both its ends to a ride-on supporting means and is vertically adjustable relative to the ground. Connected to at least one fastening end there is, according to an embodiment of the invention, a feeding means for killer, comprising a hose having its other end, remote from the fastening means, attached in a threaded nipple which is adjustable by an adjusting means attached to the body and engaging the nipple to extend the hose in order to stretch it and to adjust the size of holes provided in the walls of the hose to permit varying dispensation of killer.

In a further embodiment the assembly has a feeding means including hoses of various diameter nested within each other and joined at the fastening end of the assembly, the open ends of the hoses, remote from the fastening means, being situated at different distances so that the distance is the greatest for the hose having the smallest diameter, and said distances can be uniformly distributed along the assembly.

In a final embodiment the assembly is adapted to be supported in a direction deviating from the vertical direction.

The invention will be described in more detail hereinafter with reference to the accompanying drawing, wherein:

FIG. 1 shows an assembly as seen in the coating direction;

FIG. 2 is a side view of the assembly of FIG. 1;

FIG. 3 shows another embodiment illustrated in the same manner as in FIG. 2;

FIG. 4 shows a detail of a killer supply means;

FIG. 5 shows a further embodiment, illustrated in the same manner as in FIG. 2;

FIG. 6 shows still another embodiment;

FIG. 7 shows a conical, helical assembly;

FIG. 8 shows the assembly of FIG. 7 fitted on a plantting stick for tree plants;

FIG. 9 shows an assembly adapted for rolling on the ground;

FIG. 10 is a side view of an assembly with a wide range of operation;

FIG. 11 shows the same assembly as seen in the coating direction;

FIG. 12 shows an assembly for coating furrows in the ground;

FIG. 13 shows an assembly for killing weeds on railway embankments; and

FIG. 14 shows a supply means.

In FIG. 1, 10 designates an assembly, shown in crossection, and two adjacent assemblies 11. The assembly 10 is fastened in a square pipe 12 by means of a lead-through 13 which may be of the same type as a tight lead-through for an electric cable. 14 designates the resilient body, taking the form of a straight spring wire, while 15 designates the capillary envelope which takes the form of a stocking. The lead-through 13 constitutes a fastening means for the assembly in the pipe 12, which contains killer. The capillary envelope 15 extends into the pipe 12 from which it sucks out killer so that the capillary envelope will be soaked all through by the killer. FIG. 2 is a side view of the assembly of FIG. 1, with reference numerals identical with those used in FIG. 1. In FIG. 2 16 indicates the extreme end of the body 14 which may constitute a certain wear protection during coating.

In FIG. 3, 20 designates the coating assembly which carries, at its extreme end, a metal lining 21 which forms a wear protection and also constitutes a weight making the assembly bear against the ground. 22 designates a pipe corresponding to the pipe 12, and 23 a duct corresponding to 13. 24 designates a closely wound, helical spring constituting the resilient body. Outside the spring is a woven stocking 25 arranged as a capillary carrier for the killer.

FIG. 4 shows part of a killer supplying means. The assembly is in principle carried out as the assembly shown in FIG. 1. 34 designates the resilient body which is in the form of a wire. This is inserted in a threaded hole in a bushing 33. Inserted in the threaded hole is an adjusting screw 32 bearing against the end of the body 34. The screw and the extreme end of the assembly are covered by a cap 31 which forms a mudguard for the screw 32 and a wear protection for the assembly. Attached to the bushing 33 is a capillary carrier 35 in the form of a woven textile stocking. Inside the textile stocking is a hose 36, also attached to the bushing 33. The hose has slits 37 cut transversely of the longitudinal direction of the hose. Killer liquid 38 has been fed into the hose from the fastening end thereof. By turning the adjusting screw 32 it is possible to move the bushing 33 outwards and thus extend the hose 36 whereby the slits 37 will widen and let out more killer liquid to the capillary carrier 35.

FIG. 5 shows an assembly including a pipe container 42 with a pipe socket 43 having attached to it a body 44 in the form of a leaf spring. The capillary carrier 45, being in the form of a rope or wick, is secured to the body 44 by means of clips 41.

FIG. 6 shows an assembly where the resilient body 54 consists of a resilient tube 54 which is filled with the capillary carrier 55 which may be in the form of a woven textile rope or a foamed plastics strand. A longitudinal opening in the body 54 is designated by 53. Several such longitudinal openings may be arranged in succession in aligned relationship. The capillary carrier protrudes outside the tube 54 through the opening and creates in this way coating surfaces 52. By turning the assembly about its longitudinal axis it is thus possible to orientate the coating surface 52 in the desired direction. Finally there is a cap 51 at the end of the assembly to seal the assembly and form wear protection.

FIG. 7 shows a pipe 62 with a bushing 63 to which a conical, helical assembly 60 is connected. The form of the assembly 60 is defined by the resilient body and this assembly may be carried out in accordance with any of the embodiments described above.

FIG. 8 shows a planting tube 65 consisting of a tube 66 and a prong 67 which can be opened by the control mechanism 68 so that the plant will be carried down into the soil. The planting tube is provided with a killer assembly 64 of the kind shown in FIG. 7. When the stick is pressed down into the ground the various turns of the assembly apply themselves around the planting stick and coats weeds within a certain range around the plant to prevent it from being choked by weeds.

FIG. 9 shows an assembly 70 of cylindrical helical shape. The assembly is attached to two round disks or wheels 71 and 72 which are adjustable on a shaft 73. The disks 71, 72 are slidable on the shaft and due to this the width of the coating range can be adjusted as desired with varying width. This is advantageous in weed-killing when bushes, trees or the like are planted in straight rows and the killing apparatus is advanced between the rows. It can then be narrowed in width when passing bushes and trees. The shaft 73 is carried by a bow 75 with a draw-bar and handle. Mounted on the bow is a container 76 for killer, from which the killer is led through conduits 77 and 78 via the wheels 71, 72 to the assembly 70.

FIG. 10 is a side view of a killing apparatus which is built up of overlapping hollow beams 81 and 82 arranged behind and before each other and constituting at the same time containers for killer. The pipes 81 and 82 are secured to draw-bars (not shown) and are provided with attachments 83 and 84 in which arms 85 and 86 are pivotally mounted, which, at the other end, carry wheels of which only the wheel 87 is shown in FIG. 10.

The rear beam 81, as seen in the driving direction 89, carries a killer assembly 80 which is U-shaped and has both its ends attached to the hollow beam-container 81. The forward tubular beam 82, as seen in the driving direction, carries in the same manner an assembly 90 which is laterally displaced relative to the assembly 80, as is more clearly apparent from FIG. 11. The height of the assembly 80 above the ground level can be adjusted by an adjusting means, schematically indicated and designated by 91. The assembly 90 can be adjusted in a similar manner by corresponding means.

FIG. 11 is a rear end view of the apparatus of FIG. 10. The U-shape of the assemblies 80 and 90 is apparent from this figure. Other numerals refer to the same details as in FIG. 10.

FIG. 12 shows an apparatus for killing weeds in furrows. A hollow beam 92 carries supports 93 for a distributor 94 to which assemblies 95 are attached in various angles deviating from the vertical.

FIG. 13 shows an apparatus for killing weeds on a railway embankment. Hollow beams 96 are interconnected by means of joints 97 and carry a series of assemblies 98. Due to their rigidity these assemblies can be directed inwardly beneath the head of the rails, as is shown in the figure, for complete coating of all the irregularities of the embankment.

FIG. 14 shows a supply means for an assembly 100 which consists of an outer hose or tube 104 which is fastened in a hollow beam 102. The tube 104 is provided with a cap 101. The killer 103 in the hollow beam 102 is led into three hoses 105, 106 and 107 of successively smaller diameter and successively increasing length. As appears from the figure, the hoses are nested within each other. Killer flows out from the ends of the hoses, as is indicated by arrows. In this way the killer is uniformly distributed throughout the length of the assembly 100.

In the foregoing various embodiments of the invention have been described. Further embodiments may readily be carried out by those skilled in the art within the scope of the appended claims.

I claim:

1. Assembly for killing of weeds by applying liquid weed killer to the weeds, said assembly comprising:
   a supporting means,
   a source means for weed killer comprised within said supporting means,
   a resilient elongated self-supporting structure for yieldingly engaging an obstruction, said self-supporting structure fastened at least at one end to the supporting means,
   a capillary carrier for a weed killer, said capillary carrier positioned parallel to and around said self-supporting structure, said self-supporting structure being at least the same length as said capillary carrier, and
   supply means communicating said source means of weed killer internally to the capillary carrier at said one end thereof, wherein the self-supporting structure has the form of an elongated resilient body and the capillary carrier has the form of a porous wick, and said other end of said resilient elongated self-supporting structure including a wear protection ballast means for maintaining the position of said other end in a desired treatment location.

2. The assembly as claimed in claim 1, wherein the body is in the form of a straight finger and the capillary carrier completely surrounds the body.

3. The assembly as claimed in claim 2, wherein said ballast means is in the form of a metal lining.

4. The assembly as claimed in claim 1, wherein the self-supporting structure is of cylindrical helical shape.

5. The assembly as claimed in claim 1, wherein said self-supporting structure is oriented in a direction deviating from the vertical direction.

6. The assembly as claimed in claim 1, wherein the self-supporting structure is a closely wound helical spring.

7. The assembly as claimed in claim 1, wherein said self-supporting structure includes an elongated cylindrical element, said cylindrical element having a first end attached to said supporting means, a supply hose having transverse slits, said hose positioned around said cylindrical element and said hose having a first end attached to said supporting means, a bushing affixed to the second end of said hose, said bushing defining an axially threaded bore overlying said cylindrical element, and a threaded element threadedly engaging said threaded bore and adapted to be adjusted against said cylindrical element whereby said bushing can be adjusted relative to the cylindrical element to extend said hose to increase the size of said transverse slits.

8. Assembly for killing of weeds by applying liquid weed killer to the weeds, said assembly comprising:

a supporting means, a resilient elongated self-supporting structure for yieldingly engaging an obstruction, said self-supporting structure fastened at least at one end to the supporting means, a capillary carrier for a weed killer, said capillary carrier positioned parallel to and around said self-supporting structure, said self-supporting structure being at least the same length as said capillary carrier, supply means for supplying weed killer internally to the capillary carrier at said one end thereof, said self-supporting structure including an elongated cylindrical element, said cylindrical element having a first end attached to said supporting means, a supply hose having transverse slits, said hose positioned around said cylindrical element and said hose having a first end attached to said supporting means, a bushing affixed to the second end of said hose, said bushing defining an axially threaded bore overlying said cylindrical element, and a threaded element threadedly engaging said threaded bore and adapted to be adjusted against said cylindrical element whereby said bushing can be adjusted relative to the cylindrical element to extend said hose to increase the size of said transverse slits.

* * * * *